(12) United States Patent
Zhang

(10) Patent No.: US 7,325,874 B2
(45) Date of Patent: Feb. 5, 2008

(54) LATCH MECHANISM

(75) Inventor: Xinhui Zhang, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 405 days.

(21) Appl. No.: 10/966,082

(22) Filed: Oct. 14, 2004

(65) Prior Publication Data
US 2006/0082204 A1  Apr. 20, 2006

(51) Int. Cl.
B60N 2/00 (2006.01)
(52) U.S. Cl. .................... 297/336; 297/378.1
(58) Field of Classification Search ............... 297/336, 297/378.1; 296/65.09
See application file for complete search history.

(56) References Cited

U.S. PATENT DOCUMENTS

| 3,669,488 | A |   | 6/1972  | Derrickson, Jr. et al. |       |
|-----------|---|---|---------|------------------------|-------|
| 4,475,769 | A |   | 10/1984 | Crawford et al.        |       |
| 4,971,379 | A | * | 11/1990 | Rumpel et al. .......... | 296/63 |
| 5,125,711 | A |   | 6/1992  | Syed et al.            |       |
| 5,743,596 | A |   | 4/1998  | Chabanne               |       |
| 5,918,918 | A |   | 7/1999  | Mosley                 |       |
| 5,951,086 | A |   | 9/1999  | Hoshino et al.         |       |
| 6,123,379 | A |   | 9/2000  | Yamada et al.          |       |
| 6,135,555 | A | * | 10/2000 | Liu et al. .............. | 297/336 |
| 6,290,297 | B1 |  | 9/2001  | Yu                     |       |
| 6,345,867 | B1 |  | 2/2002  | Hellrung et al.        |       |
| 6,354,663 | B1 | * | 3/2002  | Zhang et al. ............ | 297/336 |
| 6,361,098 | B1 |  | 3/2002  | Pesta et al.           |       |
| 6,375,245 | B1 |  | 4/2002  | Seibold et al.         |       |
| 6,412,849 | B1 |  | 7/2002  | Fast                   |       |
| 6,644,744 | B2 |  | 11/2003 | Seibold                |       |
| 6,676,198 | B2 |  | 1/2004  | Demptos et al.         |       |
| 2003/0062752 | A1 | | 4/2003 | Seibold                |       |
| 2003/0107232 | A1 | | 6/2003 | Demptos et al.         |       |

* cited by examiner

Primary Examiner—Milton Nelson, Jr.
(74) Attorney, Agent, or Firm—Foley & Lardner LLP

(57) ABSTRACT

A latch mechanism includes a latch hook and an anti-chuck latch, the latch mechanism being connected to a removable seat assembly having a seat back movable between an upright and a folded position. When the seat back is in a folded position, the anti-chuck hook of the latch rotates such that the seat may be removed from a striker in the floor of the vehicle. When the seat back is moved from the folded position, a cam is driven to engage a pawl to lock the anti-chuck hook in a position such that the seat may not be removed from the striker bar even when the latch hook is released.

20 Claims, 5 Drawing Sheets

LATCH MECHANISM

TECHNICAL FIELD OF THE INVENTION

The present invention relates generally to latch or locking mechanisms and more specifically to latch mechanisms for vehicles including for use, in particular, with a vehicle seat.

BACKGROUND OF THE INVENTION

To allow for a more versatile vehicle interior, many vehicle manufacturers provide removable or stowable seats or seat assemblies for their vehicles, such as their sport utility and mini-van vehicles. Generally, removable or stowable seats are arranged as the second and/or third row seats. The removable seat assembly is more versatile because it provides for increased cargo room and flexibility in vehicle usage. Often removable seats can also be adjusted and/or stowed to minimize the volume of space occupied by the seats for similar reasons. However, existing latch mechanisms have the drawback that they will allow the seat to be unlatched from the vehicle floor even while the vehicle seat is in the upright position, such as while being used by a vehicle occupant.

The removable or stowable seat assemblies typically attach to a striker bar or similar structure in a vehicle floor through a latching mechanism. In a typical arrangement, the seat assembly first attaches to a first or front striker bar, generally a right and a left attachment point, and is then rotated to move the latch towards a rear striker in the floor of the vehicle, again generally for attachment on the right and the left. In a stowable seat, the front latches are not designed to be detached by a vehicle user, but merely to serve as a pivot point in stowing the seats. In a removable seat, all of the attachment points are removable.

It is preferable to provide a latch mechanism that can connect the seat to the vehicle floor free from a high engaging effort, a high release effort, and with minimal buzz-squeak-rattle ("BSR") issues. High engaging and release efforts may arise because the striker bar in the vehicle floor is not in the precise design position relative to the latch mechanism due to tolerances resulting from the manufacturing process, thus a higher force may be needed to engage or disengage the latch with the striker in the floor. The imprecision can also result in a gap in the latch interface and cause BSR issues.

Therefore, to ensure that the removable seat assemblies securely fasten to the vehicle floor without causing squeaks and rattles during vehicle travel, the manufacturers must currently insist on very tight placement tolerances of the front connection relative to the rear connection. These very tight placement tolerances add cost to the vehicle, which is often passed down to the final customer.

Thus, there is a need for a latch mechanism usable in removable vehicle seats that provides greater ability to manage tolerances within the latch in the fore-aft and up-down directions in repeated uses without significantly adding costs to the mechanism. There is also a continued need to provide a latch that will not allow the seat to be unlatched from the vehicle floor when in the upright position.

SUMMARY OF THE INVENTION

The present invention provides an improved latch mechanism. One embodiment of the invention comprises a latch or locking mechanism including a structural or latch hook and an anti-chuck hook. The latching system comprises a first latch plate and a second latch plate both adapted to be coupled to the seat assembly. A latch hook is disposed between the first latch plate and the second latch plate and coupled thereto for rotational movement about a first pivot axis between an engaged position and a disengaged position, the latch hook being engageable with the seat striker in the engaged position to hold the seat assembly against the seat striker. An anti-chuck hook is disposed between the first latch plate and the second latch plate and coupled thereto for rotational movement about a second pivot axis between an engaged position and a disengaged position. A cam and a pawl are positioned operatively in communication with the anti-chuck hook wherein the cam and pawl are adapted to lock the anti-chuck hook in a position when a seatback in communication thereto is in an upright position, thus preventing rotation of the anti-chuck hook. Thus, the latching mechanism remains latched to the striker preventing the seat from become detached from the floor when the seat back is upright even if the latch hook is released.

DETAILED DESCRIPTION OF THE PREFERRED EMBODIMENTS

Figure 6:
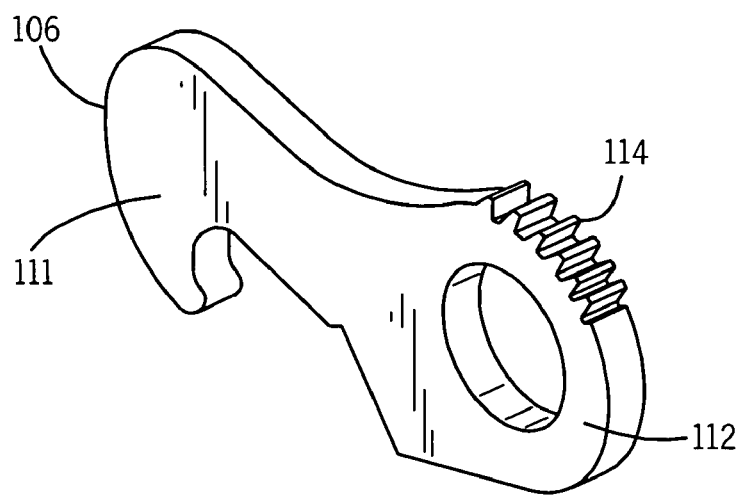
FIG. 6 illustrates the latch hook depicted in the latching mechanism of FIG. 1.
Figure 7:
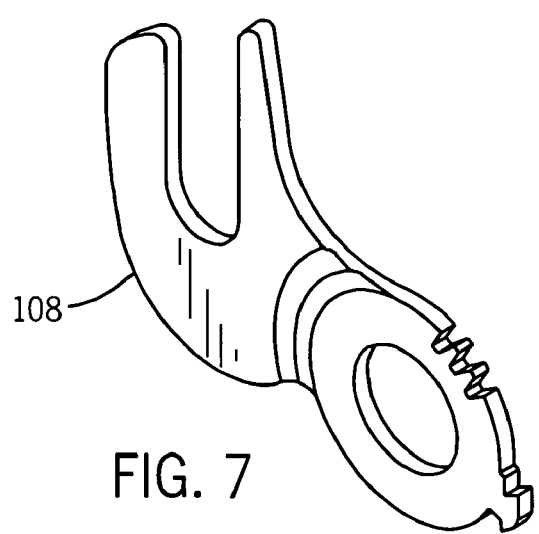
FIG. 7 illustrates the anti-chuck hook depicted in the latching mechanism of FIG. 1.
Figure 10:
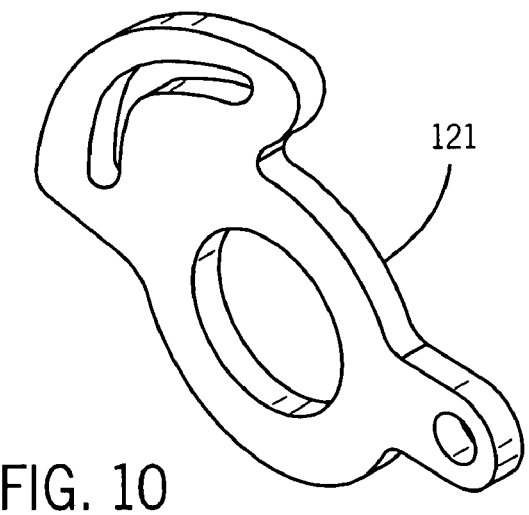
FIG. 10 illustrates the cam depicted in the latching mechanism of FIG. 1.
Figure 11:
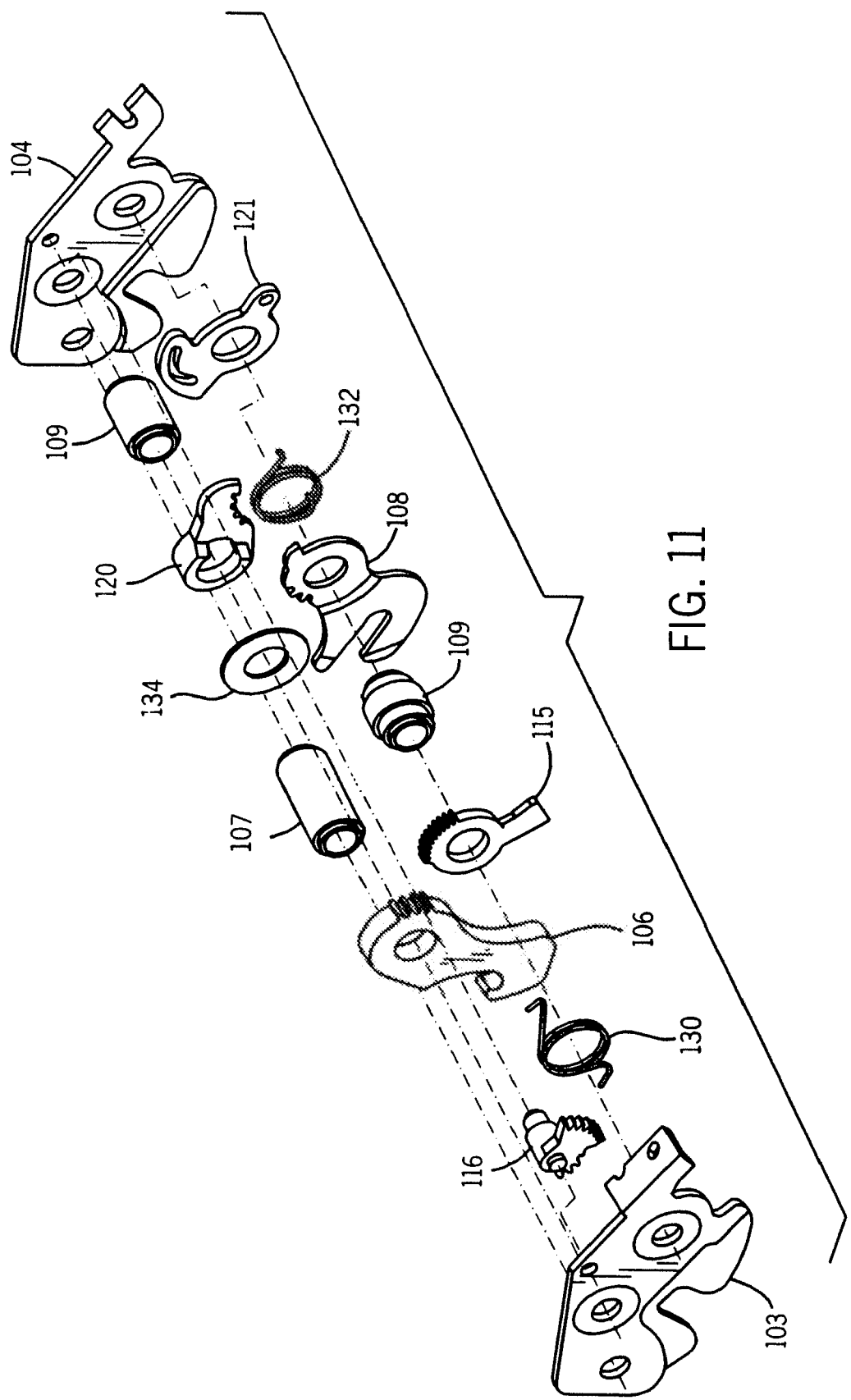
FIG. 11 illustrates an exploded view of the latching mechanism.

The present invention provides a floor locking or latching mechanism 100 that can be used in a variety of applications but has particular application in foldable, stowable, or removable seats. The latch mechanisms 100 of the present invention may be used in combination with known latches on a vehicles seat assembly. The latch mechanism 100 provides greater accommodation of tolerancing issues without significantly adding costs to the latch mechanism. The latching mechanism 100 of the present invention has been designed for use with a removable or stowable seat assembly or other types of assemblies that are engageable with a seat striker 102. The latching mechanism 100 is designed to lock a seat to a vehicle floor firmly without a preload in seat structure, as long as the striker is in a predetermined range of system variation with respect to the latch, to reduce both engaging and release effort. Further, the operation of the latching mechanism 100 is also controlled by the seatback position. The latching mechanism 100, and thus the seat, can only be released when the seatback is in the folded position. This latching mechanism 100 (shown in an exploded view in FIG. 10) includes two latch plates 103, 104 and two hooks, a latch or structural hook 106 (FIG. 6) and an anti-chuck hook (FIG. 7) 108.

Figure 1:
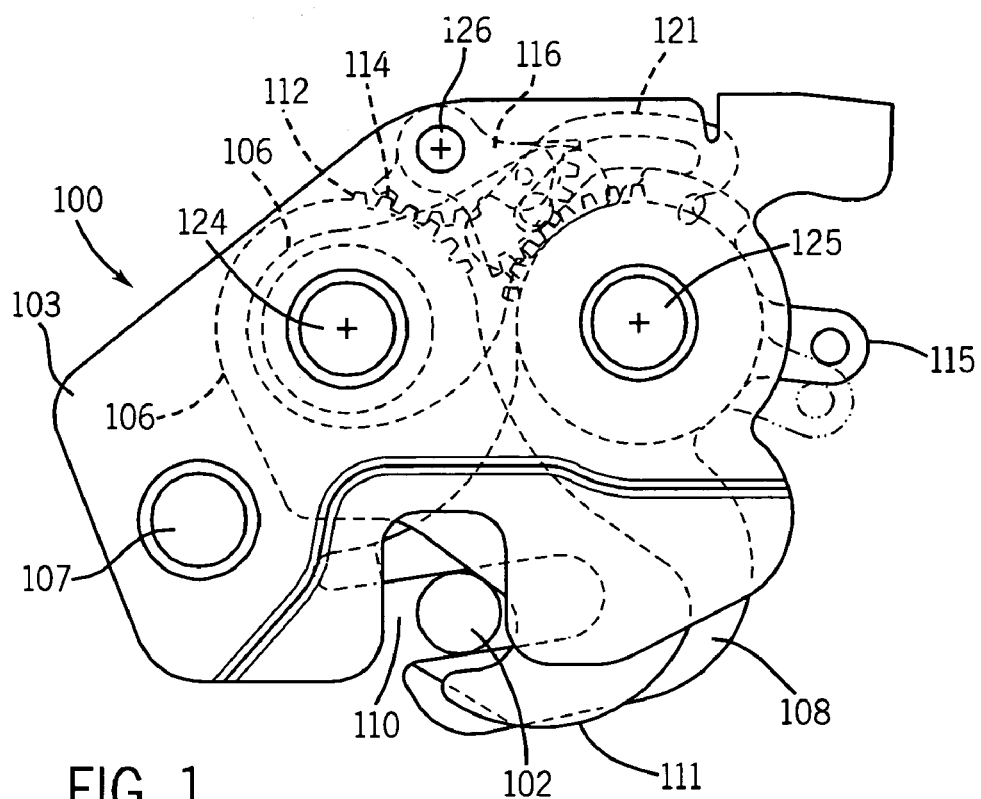
FIG. 1 is a view of the latching mechanism showing the latch hook and the anti-chuck hook.

One embodiment of the present invention relates to a latching mechanism 100 having a first latch plate 103 and a second latch plate 104. The latch plates may of any design understood by one of ordinary skill in the art to provide the requisite structure and are not limited to being a smooth flat thin piece of material. The latching plates are spaced apart but connected via connecting means such as but not limited to pins 107 and bushings 109, bolts, welds, and the like to define an area there between. The latching plates 103, 104 have a relatively large cutout at the bottom or floor end of the latching plates 103, 104 forming a latching area 110 that represents a predetermined range of variation in both the X direction (fore-aft) and the Z direction (up-down). (Refer to FIG. 1) The latching areas 110 of the first latch plate 103 and the second latch plate 104 are substantially aligned to allow the striker 102 to be disposed within the latching areas. In one embodiment, the latch area or cut out sections 110 are generally U-shaped.

The latch hook 106 is disposed between the first latch plate 103 and the second latch plate 104 and rotatably attached thereto such as via a bushing 109 and pin 107. The latch hook 106 is rotatable about a first axis of rotation 124. In one embodiment, a pin 107 and bushing 109 connecting the first latch plate to the second latch plate define the first axis of rotation 124. The latch hook 106 has a cutout forming the "hook" portion 111 and an actuating end 112 opposite thereof.

Figure 5:
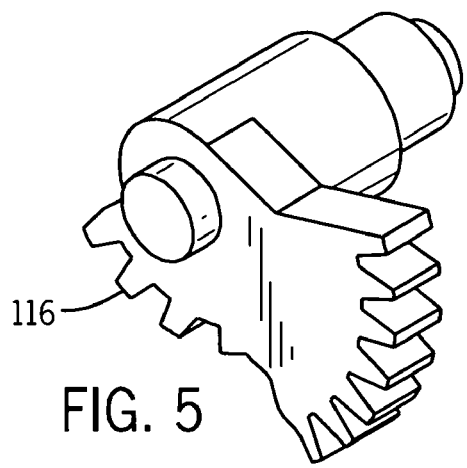
FIG. 5 illustrates the gear depicted in the latching mechanism of FIG. 1.
Figure 8:
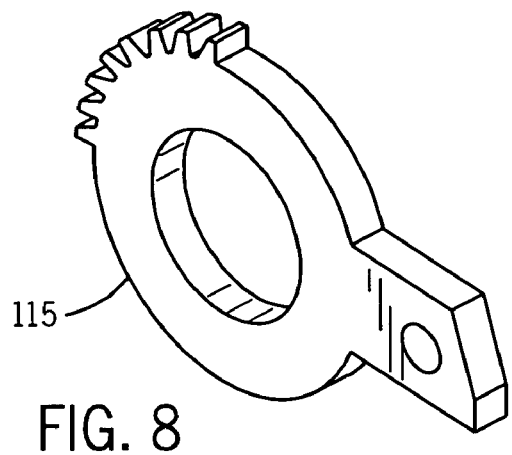
FIG. 8 illustrates the lever gear release depicted in the latching mechanism of FIG. 1.

In one embodiment, the actuating end 112 has teeth or a gear portion 114 which are adapted to engage a transfer gear 116 (FIG. 5) and a release lever 115 having a gear portion (FIG. 8). The transfer gear 116 and release lever 115 are, in an exemplary embodiment, rotatably affixed substantially between the first latch plate 103 and the second latch plate 104. In one embodiment, the release lever 115 is rotatable about a second axis of rotation 125 defined by a connecting means such a pin and bushing. The transfer gear 116 is rotatable about a third axis of rotation 126 which is defined by an attachment means such as a bolt or a pin and bushing which are connected to one of the first or second latch plates 103, 104 so as to be able to engage the gear portion of the release lever 115 and the gear portion 114 of the latch hook 106.

Figure 2:
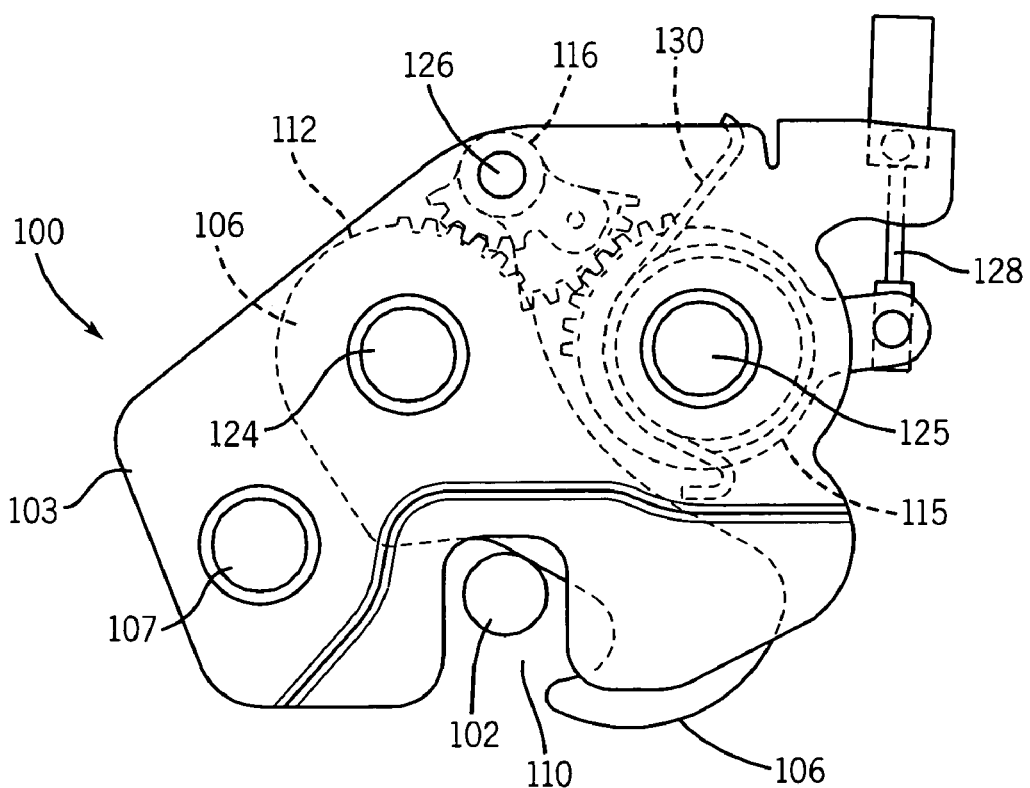
FIG. 2 is a partial view of the latching mechanism showing the latch hook.

The latch hook 106 is biased by a biasing mechanism. In one embodiment it is biased by a spring member 130 to clamp against the striker 102. The biasing mechanism is capable of firmly retaining the latch hook against the striker. A coiled spring may be used wherein one end is coupled to the first plate 103 and the other end is coupled to the latch hook 106. The rotation angle of the latch hook 106 relies on the striker 102 location. The latch hook 106 is also used to take FVMSS load. The latch hook 106 has a large cutout area at the front that provides a greater tolerance range in which the hook end 111 is able to-catch the striker 102. In one embodiment, the latch hook 106 has a hook end 111 with a relatively shallow hook in comparison to the anti-chuck hook 108 described below. (Refer to FIG. 2)

Figure 9:
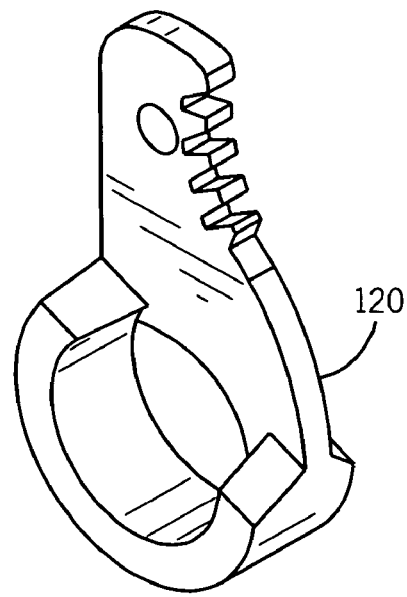
FIG. 9 illustrates the pawl depicted in the latching mechanism of FIG. 1.

The anti-chuck hook 108 is also provided, which is disposed between the latch plates 103, 104, and in one exemplary embodiment first latch plate 103 and the latch hook 106. The anti-chuck hook 108 is rotatably attached to either the first latch plate 103 or the second latch plate 104 or both by a connecting means such as via a bushing 109 and pin 107. In one embodiment, the anti-chuck hook may be biased by a spring 132, such as a coiled spring connected at one end to the anti-chuck hook 108 and at the other end to the cam release lever 121. In one embodiment, when the anti-chuck hook is in a free position it is rotatable about the second axis of rotation about which the release lever 115 is rotatable. The anti-chuck hook 108 may, in one embodiment, have a plastic cover (not shown) to avoid direct contact between steel parts to eliminate BSR. (Refer to FIG.1) The opening in plastic cover of the anti-chuck hook 108 has, in one embodiment, a little interference with the striker 102 to avoid relative movement between the striker 102 and the anti-chuck hook 108. The anti-chuck hook 108 has an outcropping at a top area of the anti-chuck hook 108. The anti-chuck hook outcropping is used to lock the anti-chuck hook 108 in a locked position or state through a pawl 120 (FIG. 9) and a cam release lever (FIG. 10) acting as a can wherein the anti-chuck hook is not rotatable about the second axis of rotation. Thus, when in the free state, the anti-chuck hook 108 is freely rotatable about the second axis of rotation 125, but when the cam release lever 121 is engaged, the pawl 120 locks the anti-chuck hook 108 in a locked state preventing rotation about the second axis of rotation 125. In one embodiment, the cam release lever 121 is rotatable about the second axis of rotation 125 as is the anti-chuck hook 108 and the release lever 115. The pawl 120, in one embodiment, is affixed at the first axis of rotation 124 with the latch hook 106.

Control means are provide which can independently control the latch hook 106 and the anti-chuck hook 108. In one embodiment, the latch hook 106 has a release mechanism connected via, for example, a cable. The control cable 128 for the latch hook 106 may be coupled to the release lever 115. A release cable 129 for anti-chuck hook 108 is coupled to the cam release lever 121 and driven by seatback motion to drive the cam release lever 121, thus locking or unlocking the anti-chuck hook 108 via the cam and pawl action.

Figure 3:
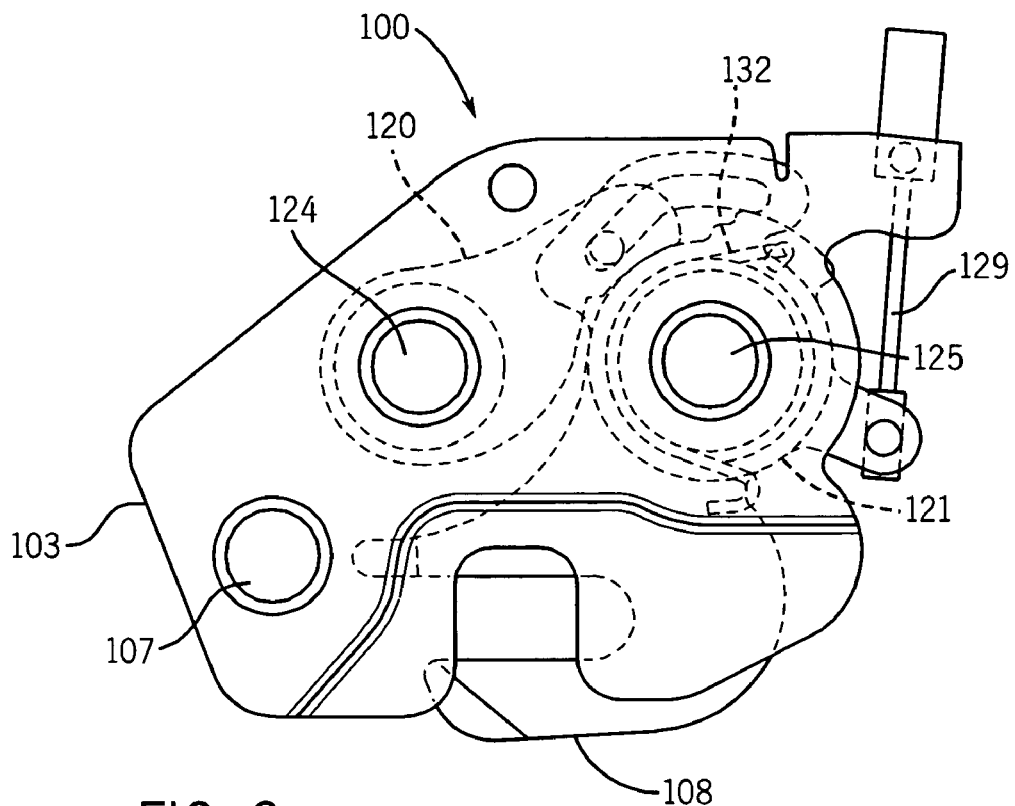
FIG. 3 illustrates the latching mechanism with the anti-chuck hook and with the seat in the upright position.
Figure 4:
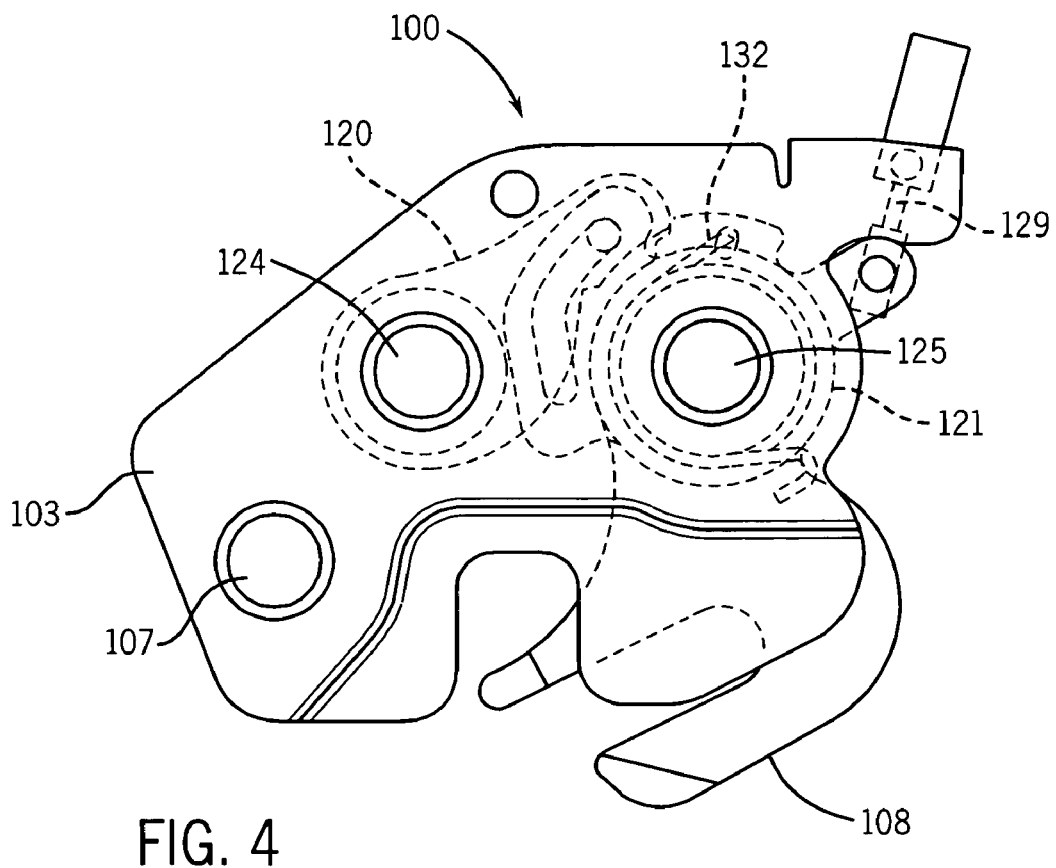
FIG. 4 illustrates the latching mechanism with the anti-chuck hook and with the seat in the folded position.

The anti-chuck hook 108 is free to rotate when the seatback is in a folded position and is locked when the seat is in the upright, or design position. (Refer to FIG. 3 and FIG. 4) In this manner, the anti-chuck hook 108 securely latches the seat assembly even if the latch hook 106 is released. The latching mechanism 100 of the present invention is able to reset itself to the initial position every time after released and is ready to compensate for system variation in the next engagement. In one embodiment, this is accomplished by biasing both the latch hook 106 and the anti-chuck hook 108, such as by a springs 130, 132. A washer 134 may also be provided between the latch hook 106 and the anti-chuck hook 108.

Both the latch hook 106 and the anti-chuck hook 108 interact with the striker 102. When the anti-chuck hook 108 is engaged, the striker 102 is disposed within the throat of the anti-chuck hook 108 and the latch hook 106 is retained against the striker 102. The latch hook 106 is retained against the striker 102 such that if the anti-chuck hook 108 is disengaged (i.e., the seatback is placed in a down position) then the latch hook 106 will rotate about its axis of rotation to engage the striker 102 in the throat of the hook structure 111 of the latch hook 106 thereby maintaining the seat in a latched position.

In one embodiment, the latching area 110 of both of the latching plates 103, 104 is substantially larger than the cross section of the striker 102 so as to allow for much variability in the alignment of the striker 102. The present invention allows for these latching plates 103, 104 to have larger cutout sections due to the interaction of the latch hook 106 and anti-chuck hook 108.

Another aspect of the present invention relates to a method of locking a foldable seat having a latching mechanism 100 of the present invention to a vehicle floor having a striker 102. When locking a seat to vehicle floor in accordance with the principles of the present invention, the seatback is in folded position and the anti-chuck hook 108 is in free condition and able to rotate about its pivot point. The striker 102 is positioned in the cutout or latching areas of the first latch plate 103 and the second latch plate 104. Both the latch hook 106 and the anti-chuck hook 108 engage the striker 102 and rotate about their pivots to follow the striker 102 as the seat is placed into position in the vehicle. In one embodiment, while the striker 102 is located disposed within the anti-chuck hook 108, the striker 102 is not disposed within the throat area of the latch hook 106. However, the latch hook 106 is held firmly against the striker 102 by a strong biasing mechanism such as spring 130. When the seat is in position in the vehicle, the striker 102 will be located within the latching areas 110 of the first and second latch plates 103, 104 and be retained by the anti-chuck hook 108. The anti-chuck hook 108 eventually reaches and stays in a position where the seat is in equilibrium. Thus, even when the latch hook 106 is released, the seat will remain latched by the anti-chuck hook 108 when in the seatback is upright. When the seatback is in the down position, the latch hook 106 retains the seat in place. For example, in one embodiment, when the seat back is placed in the down position and the anti-chuck hook 108 is released, the biasing mechanism of the latch hook 106 positions the latch hook 106 wherein the latch hook 106 engages the striker 102 to retain the seat in a latched position.

After the seatback is rotated to sitting position from the folded position, the cam 121 will drive the pawl 120 to lock the anti-chuck hook 108 in the locked position, thus preventing any rotation of the anti-chuck hook and retaining the seat. When the seat is in design position, the release lever 115 can only release the latch hook 106. Thus, the seat will be still locked by the anti-chuck hook 108 even if the latch hook 106 is released.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims. While the detailed drawings, specific examples and particular formulations given describe exemplary embodiments, they serve the purpose of illustration only. For example, the system described is applied to a latch release mechanism to release the seat from a latch on the floor of the vehicle; however the present invention may also be employed in a seat reclining mechanism utilizing a striker. Furthermore, other substitutions, modifications, changes, and omissions may be made in the design, operating conditions, and arrangement of the exemplary embodiments without departing from the scope of the invention as expressed in the appended claims.

What is claimed is:

1. A latch mechanism for use in a removable seat assembly engageable with a striker, the latch mechanism comprising:
   a first latch plate and a second latch plate spaced from the first latch plate;
   a latch hook between the first latch plate and the second latch plate and rotatably coupled for rotational movement about a first pivot axis between a first position and a second position;
   an anti-chuck hook having a locked position and an unlocked position, the anti-chuck hook being disposed between the latch hook and the second latch plate and coupled for rotational movement about a second pivot axis;
   a pawl operatively in communication with the anti-chuck hook wherein the pawl selectively prevents rotation of the anti-chuck hook; and
   a cam release lever selectively operating the pawl;
   wherein operating the cam release lever operates the anti-chuck hook.

2. The latch mechanism of claim 1, wherein the cam release lever pivots on the second pivot axis and the pawl pivots on the first pivot axis.

3. The latch mechanism of claim 1, further comprising a release lever pivotable about the second pivot axis and a transfer gear pivotable about a third pivot axis and the release lever moving in response to movement of the release lever.

4. The latch mechanism of claim 3, wherein the transfer gear comprises a first gear portion in communication with the release lever and a second gear portion in communication with the latch hook wherein the latch hook is disengaged from the striker when the release lever is actuated.

5. The latch mechanism of claim 1, further comprising a latch hook biasing member connected to the latch hook and biasing the latch hook in a first direction of rotation about the first pivot axis.

6. The latch mechanism of claim 1, further comprising an anti-chuck hook biasing member connected to the anti-chuck hook and biasing the anti-chuck hook in a first direction of rotation about the second pivot axis.

7. A latching system for a removable seat assembly, the latching system adapted for engagement with a striker rod in a vehicle floor, the latching system comprising:
   a first latch plate adapted to be coupled to the seat assembly;
   a latch hook rotatably coupled with respect to the first latch plate about a first axis of rotation and having an end for engagement with the striker rod;
   an anti-chuck hook rotatably coupled to the first latch plate about a second axis of rotation and having a first position and a second position;
   the anti-chuck hook having a first end for engagement with the striker rod when in the first position;
   a cam release lever rotatable about the second axis of rotation; and
   a pawl rotatable about a first axis of rotation and in communication with the cam release lever;
   wherein the cam release lever and the pawl are in communication with the anti-chuck hook to prevent rotation of the anti-chuck hook when the seat assembly is in an upright position.

8. The latching system of claim 7, further comprising a latch hook biasing member having a first end engaging the first latch plate and a second end engaging the latch hook.

9. The latching system of claim 7, further comprising an anti-chuck hook biasing member having a first end engaging the first latch plate and a second end engaging the anti-chuck hook.

10. The latching system of claim 7, further comprising:
    a release lever pivotable about the second axis of rotation;

a transfer gear pivotable about a third axis of rotation and in communication with the release lever; and the transfer gear comprising a first gear portion in communication with the release lever and a second gear portion in communication with the latch hook;

wherein the latch hook is disengaged from the striker when the release lever is actuated.

11. The latching system of claim 7, further comprising an anti-chuck release cable coupled to the cam release lever and allowing selective movement of the anti-chuck hook between the first position and the second position.

12. The latching system of claim 11, wherein the anti-chuck release cable is driven by the movement of a seat back of the seat assembly.

13. The latching system of claim 7, further comprising a second latch plate wherein the latch hook is disposed between the first latch plate and the second latch plate and the anti-chuck hook is disposed between the first latch plate and the latch hook.

14. The latching system of claim 13, further comprising a first pivot member extending between the first latch plate and the second latch plate and defining the first axis of rotation and a second pivot member extending between the first latch plate and the second latch plate and defining the second axis of rotation.

15. A method for operating a latching assembly for a seat assembly including a seat back, the seat assembly being engageable with a striker, the method of operating the latching assembly comprising:

providing a latch mechanism in the seat assembly wherein the latch mechanism includes a latch hook and an anti-chuck hook;

engaging the latch hook with the striker; and engaging the anti-chuck hook with the striker when the seat back is in a first position such that when the latch hook is released in response to movement of the seat back, the anti-chuck hook remains engaged with the striker.

16. The method of claim 15, further comprising the step of removing the seat assembly from the striker.

17. The method of claim 15, further comprising the step of moving the seat back of the seat assembly to a second position allowing the anti-chuck hook to disengage from the striker.

18. The method of claim 16, further comprising the step of providing an anti-chuck release cable having a first end coupled to the seat assembly and a second end operatively coupled to the anti-chuck hook.

19. The method of claim 15, further comprising the step of activating a release mechanism for the latch hook to position the latch hook in the disengaged position wherein the seat assembly remains latched to the striker via the anti-chuck hook.

20. The method of claim 19, further comprising the steps of positioning the seat back of the seat assembly in a second position, disengaging the anti-chuck hook from the striker, and disengaging the seat assembly from the striker.

* * * * *